United States Patent
König et al.

(10) Patent No.: US 12,085,526 B2
(45) Date of Patent: Sep. 10, 2024

(54) SENSOR DEVICE AND ELECTRONIC ASSEMBLY

(71) Applicant: TDK Corporation, Tokyo (JP)

(72) Inventors: Matthias König, Munich (DE); Matthias Schmidt, Munich (DE); Markus Mayr, Anzing (DE)

(73) Assignee: TDK Corporation, Tokyo (JP)

( * ) Notice: Subject to any disclaimer, the term of this patent is extended or adjusted under 35 U.S.C. 154(b) by 931 days.

(21) Appl. No.: 16/534,960

(22) Filed: Aug. 7, 2019

(65) Prior Publication Data

US 2020/0049647 A1 Feb. 13, 2020

(30) Foreign Application Priority Data

Aug. 7, 2018 (DE) .......................... 102018119212.6

(51) Int. Cl.
*G01N 27/16* (2006.01)
*G01N 31/10* (2006.01)

(52) U.S. Cl.
CPC ............. *G01N 27/16* (2013.01); *G01N 31/10* (2013.01)

(58) Field of Classification Search
CPC ............................... G01N 27/16; G01N 31/10
See application file for complete search history.

(56) References Cited

U.S. PATENT DOCUMENTS

| | | | |
|---|---|---|---|
| 5,360,266 A | 11/1994 | Lenfers et al. | |
| 5,831,146 A | 11/1998 | Newman | |
| 2011/0203348 A1* | 8/2011 | Hedayat | G01N 15/0656 73/23.33 |
| 2014/0208828 A1* | 7/2014 | Von Waldkirch | G01N 27/123 73/25.05 |

FOREIGN PATENT DOCUMENTS

| | | | | |
|---|---|---|---|---|
| DE | 3839414 A1 | 5/1990 | | |
| DE | 4008150 A1 | 9/1991 | | |
| DE | 4137197 A1 | 5/1993 | | |
| DE | 4221922 C1 | 1/1994 | | |
| DE | 69808553 T2 | 2/2003 | | |
| WO | WO-9510770 A1 * | 4/1995 | ............ | G01N 25/30 |
| WO | WO-2014143175 A1 * | 9/2014 | ............ | G01N 27/26 |

OTHER PUBLICATIONS

Nagarajan et al (A Linearizing Digitizer for Wheatstone Bridge Based Signal Conditioning of Resistive Sensors, IEEE Sensors Journal, 2017, vol. 17, pp. 1696-1705) (Year: 2017).*
Dictionary.com (Definition of enclose, Dictionary.com, retrieved Feb. 2022, 6 pages) (Year: 2022).*

(Continued)

*Primary Examiner* — Paul S Hyun
*Assistant Examiner* — Jean Caraballo-Leon
(74) *Attorney, Agent, or Firm* — Slater Matsil, LLP

(57) ABSTRACT

A sensor device and an electronic assembly are disclosed. In an embodiment a sensor device includes a first pellistor element, a second pellistor element, a heater element, a first temperature sensor element and a second temperature sensor element, wherein the heater element and the first temperature sensor element are part of the first pellistor element and the heater element and the second temperature sensor element are part of the second pellistor element.

22 Claims, 4 Drawing Sheets

(56) References Cited

OTHER PUBLICATIONS

Brauns, E. et al., "A Fast and Sensitive Catalytic Gas Sensors for Hydrogen Detection Based on Stabilized Nanoparticles as Catalytic Layer," ScienceDirect, Sensors and Actuators B: Chemical, vol. 193, Mar. 31, 2014, 3 pages.

"MP-7217-TC Pellistors (VQ) from SGX Sensortech, Combined Pellistor and TC Sensor," MP-7217-TC Sensortech Gas Sensor—Pellistor SGX (formerly e2v), retrieved from the internet at https://sgx.cdistore.com/products/detail/MP7217TC-SGXSensortech-Limited/559614/ on Jul. 25, 2019, 3 pages.

Nishibori, M. et al., "Thermoelectric Hydrogen Sensors using Si and SiGe Thin Films with a Catalytic Combustor," Journal of the Ceramic Society of Japan, 119, [3], 2010, 5 pages.

Nuscheler, F., "An Investigation of the Dynamic Behaviour of a Silicon Microcalorimeter," ScienceDirect, Sensors and Actuators, vol. 17, Issues 3-4, May 17, 1989, 2 pages.

\* cited by examiner

SENSOR DEVICE AND ELECTRONIC ASSEMBLY

CROSS-REFERENCE TO RELATED APPLICATIONS

This application claims the priority of German patent application 102018119212.6, filed on Aug. 7, 2018, which application is hereby incorporated herein by reference.

TECHNICAL FIELD

Embodiments of the present invention are related to a sensor device and an electronic assembly.

SUMMARY

Embodiments provide a sensor device, preferably a sensor device that comprises the functionalities of a gas sensor. Further embodiments provide an electronic assembly, preferably comprising such sensor device.

According to at least one embodiment, a sensor device comprises at least one pellistor element. Accordingly, the sensor device can comprise one pellistor element. Preferably, the sensor device can comprise two pellistor elements. It is also possible that the sensor device comprises more than two pellistor elements.

According to a further embodiment, an electronic assembly can comprise at least one pellistor element. Preferably, the sensor device comprising at least one pellistor element can be part of the electronic assembly which can be operated as a gas sensor. Particularly preferably, the electronic assembly can comprise a measurement circuit, which can be, for instance, a Wheatstone Bridge. The at least one pellistor element or, preferably, the sensor device can be part of the measurement circuit.

According to a further embodiment, the at least one pellistor element comprises a heater element and a temperature sensor element. When operated, the heater element can increase the temperature of the pellistor element or of at least a part of the pellistor element. The temperature sensor element can be embodied to measure the temperature of the pellistor element or of at least a part of the pellistor element.

According to a further embodiment, the heater element of the at least one pellistor element is embodied as a heating filament or heating wire and, in particular, as a heating resistance. Preferably, the heater element of the at least one pellistor element comprises or is made of a noble metal as, for example, Pt. Other metals, for example W, are also possible in addition or alternatively.

According to a further embodiment, the temperature sensor element of the at least one pellistor element comprises a material which changes its electrical resistance depending on its temperature. For example, the temperature sensor element can comprise a thermistor material, an NTC (negative temperature coefficient) material or a PTC (positive temperature coefficient) material. Furthermore, the temperature sensor element of the at least one pellistor element can comprise a noble metal and/or one or more metal oxides. For example, the noble metal comprises or is Pt.

According to a further embodiment, the heater element of the at least one pellistor element is the temperature sensor element. In other words, the heater element and the temperature sensor element can be one and the same component, which can be used for heating the pellistor element and, by measuring, for example, its temperature-dependent electrical resistance, for measuring the temperature. Alternatively, the heater element and the temperature sensor element of the at least one pellistor element can be embodied as two different components. Such pellistor can also be denoted as a microcalorimeter. The advantage of such design can be a higher sensitivity of the temperature sensor element to temperature changes compared to the heater element, so that forming the heater element and the temperature sensor element as different components can provide a higher measuring accuracy.

The sensor device can have electrical contacts for contacting the at least one pellistor element. In particular, the sensor device can have electrical contacts for contacting the heater element and the temperature sensor element of the at least one pellistor element. At least some of the electrical contacts can be embodied for measuring at least one electrical property of the at least one pellistor element and, in particular, of the temperature sensor element. The electrical property can be, for example, an electrical resistance, an electrical current and/or an electrical voltage.

According to a further embodiment, the at least one pellistor element is embodied as a catalytic pellistor or as a thermal conductivity (TC) pellistor. A pellistor element embodied as a catalytic pellistor comprises a catalyst element and, when operated by heating at least the catalyst element by means of the heater element, works by burning a gas to be examined (target gas) on the surface of the catalyst element. The additional heat that is generated by the gas combustion process on the surface of the catalyst element can be detected by means of the temperature sensor element and preferably can be used to produce a sensor signal that is proportional to the gas concentration. The catalyst element can comprise a metal oxide. The metal oxide can for instance comprise Al and/or Pt. For example, the catalyst element can comprise or consist of platinum oxide and/or aluminum oxide or aluminum oxide mixed with platinum. In case of a TC pellistor, the catalyst element is missing. The temperature sensor element of the TC pellistor element, when the pellistor element is operated by heating the pellistor element by means of the heater element to a certain temperature, measures a temperature of the pellistor element which is influenced by the heat conductivity of the gas to be examined, since the target gas changes the heat conductivity of the surrounding air. In short, the TC pellistor element can be used to measure a gas concentration via detecting information about the heat conductivity of the surrounding gas atmosphere.

According to a further embodiment, the sensor device comprises a substrate. The substrate can carry the at least one pellistor element of the sensor device. In cases where the sensor device comprises more than one pellistor element, the substrate can be a common substrate, carrying all of the pellistor elements of the sensor device. Preferably, the substrate comprises silicon. The temperature sensor element of the at least one pellistor element and preferably the temperature sensor element of each of the pellistor elements of the sensor device can be arranged in a membrane, which is arranged on the substrate. Alternatively or additionally, in cases where the temperature sensor element and the heater element of the at least one pellistor element are different components, also the heater element of the at least one pellistor element and preferably of each of the pellistor elements can be arranged in the membrane. In the case that at least one pellistor element of the sensor device comprises a catalyst element, the catalyst element can be arranged on the membrane in order to have contact to the surrounding gas atmosphere. The membrane of the sensor device comprises or is made of an electrically insulating material, for instance silicon oxide and/or silicon nitride, and at least partly or substantially completely encloses the heater element and/or the temperature element. The substrate and/or the membrane with the components arranged in the membrane can be manufactured by standard MEMS (microelectromechanical systems) technology, thereby providing small dimensions and a high degree of integration. For example, when forming the membrane with the temperature sensor element and/or the heater element, lithographic process steps can be used.

According to a further embodiment, the sensor device comprises a first pellistor element and a second pellistor element. Each of the first and the second pellistor elements can comprise features according to the embodiments described above. Preferably, the first and second pellistor elements can be formed similarly in terms of materials and/or design parameters. Particularly preferably, the first and second pellistor elements can have at least one common component, meaning that the sensor device comprises at least one component which is part of both the first and the second pellistor element. Preferably, the sensor device can have a heater element as a common component. Consequently, the sensor device can comprise the heater element, a first temperature sensor element and a second temperature sensor element, wherein the heater element and the first temperature sensor element are part of the first pellistor element, and the same heater element and the second temperature sensor element are part of the second pellistor element. In simple words, the first and second pellistor elements can share the heater element. The heater element, the first temperature sensor element and the second temperature sensor element can comprise features according to the embodiments described above. Preferably, the first and second temperature sensor elements can comprise a same material. Furthermore, the sensor device can comprise a substrate as described above, the substrate being a common substrate carrying the first pellistor element and the second pellistor element. Moreover, the sensor device can comprise a membrane as described above, the membrane being a common membrane, which is part of both the first and the second pellistor element and which at least partly encloses the heater element and/or the first temperature sensor element and the second temperature sensor element.

According to a further embodiment, the sensor device further comprises a catalyst element as described above, wherein the catalyst element is a common component of the first and second pellistor elements, meaning that the catalyst element is part of each of the first pellistor element and the second pellistor element.

According to a further embodiment, the first temperature sensor element and the second temperature sensor element of the first and second pellistor elements are arranged in a same plane in the membrane. Particularly with regard to MEMS technology, in this case the first temperature sensor element and the second temperature sensor element can be formed using the same lithography layer. Alternatively, the first temperature sensor element and the second temperature sensor element can be arranged in different planes in the membrane. In this case, an additional lithography layer is needed compared to the foregoing case. Preferably, each of the first and second temperature sensor elements can be formed in a meander-like shape. When being formed in the same plane in the membrane, the first and the second temperature sensor elements can be formed in an interlocking meander-like shape. In a preferred embodiment, the temperature sensor elements can comprise of be made of platinum.

When forming the sensor device with the first and second pellistor elements with at least the heater as a common component, the device size, cost and power consumption can be decreased compared to two separate pellistor elements, each having its own heater element and temperature sensor element. In particular, the size can be much smaller, while the power consumption remains substantially the same. As described above, the two temperature sensor elements, preferably both inside the membrane, can be manufactured in the same layer or on top of each other. In the case of the two temperature sensor elements being arranged on top of each other, an additional lithography layer is needed, while the size of each temperature sensor element could be smaller compared to the first case. However, as the heater element's size is usually the critical parameter, since it is required to be big enough to create enough heat with high homogeneity, it is not critical to arrange two temperature sensor elements in one lithography layer.

According to a further embodiment, the electronic assembly comprises at least one active pellistor element and at least one reference pellistor element. The at least one active pellistor element and the at least one reference pellistor element can be part of the same sensor device. Alternatively, the at least one active pellistor element can be part of a first sensor device, while the at least one reference pellistor element can be part of a second sensor device. For example, the at least one active pellistor element can comprise a catalyst element, while the at least one reference pellistor element can be embodied similarly to the at least one active pellistor element, but without the catalyst element or, alternatively, instead of a catalyst element with a so-called dummy element, which for instance resembles the shape and/or mass of the catalyst element, but is inert compared to the catalyst element. The reference pellistor element can be heated similarly to the active pellistor element, for example, by using the same or substantially the same electrical current. Alternatively, the at least one active pellistor element can be embodied as a TC pellistor. The at least one reference pellistor element can be embodied similarly to the at least one active pellistor element, but can be heated to a different temperature compared to the at least one active pellistor element. In both cases, the reference pellistor element can work as a compensator. The combination of the at least one active pellistor element and the at least one reference pellistor element can provide information about gas concentration changes, while other environmental changes as for instance a change in humidity and/or a change in the ambient temperature will be cancelled out or at least suppressed.

According to a further embodiment, the electronic assembly comprises a first active pellistor element, a second active pellistor element, a first reference pellistor element and a second reference pellistor element. The two active pellistor elements and the two reference pellistor elements can be electrically connected with each other and form a Wheatstone Bridge. The Wheatstone Bridge can additionally comprise a measurement device, for instance a voltage measurement device or a current measurement device. In particular, by means of such bridge-type readout, the signal level and the voltage dependence can be optimized.

The Wheatstone Bridge can have a first connection point, a second connection point, a third connection point and a fourth connection point. The first active pellistor element can be arranged between the first and second connection points, the first reference pellistor element can be arranged between the second and third connection points, the second active pellistor element can be arranged between the third and fourth connection points, and the second reference pellistor element can be arranged between the first and fourth connection points. The first and the third connection points can be configured for being connected to an electrical voltage, and the second and fourth connection points can be configured for being connected to the measurement device. The first active pellistor element and the first reference pellistor element are arranged in a first branch of the bridge circuit, while the second active pellistor element and the second reference pellistor element are arranged in a second branch of the bridge circuit. The measurement device is used to measure a voltage or current balance between the two branches of the bridge circuit. In particular, the Wheatstone Bridge can be free of any additional discrete resistor elements. In other words, in each of the two branches of the bridge circuit only an active pellistor element and a reference pellistor element are used without any additional resistor elements.

Compared to usual bridge circuits having discrete resistors in combination with pellistors, in the electronic assembly described herein the usually used resistors are replaced by additional pellistor elements so that the electronic assembly can be free of any additional resistors. Since it is very difficult to build chip-level resistors with high resistance and high accuracy and since passive component resistors are hard to include inside a package, such drawbacks can be avoided in the electronic assembly described herein. Furthermore, as two active pellistor elements and two reference pellistor elements are used in the described way, the sensitivity can be increased by a factor of 2.

According to a further embodiment, the electronic assembly comprises two sensor devices. Each of the sensor devices comprises two pellistor elements, which can be active pellistor elements and/or reference pellistor elements. Preferably, the electronic assembly comprises a first sensor device and a second sensor device, wherein the first and second active pellistor elements are part of the first sensor device, and the first and the second reference pellistor elements are part of the second sensor device. Particularly preferably, each of the first and second sensor devices comprises a first and a second pellistor element with at least one common component as described above, preferably at least a common heater element. Furthermore, the first and the second sensor device can be monolithically formed comprising a common substrate so that both branches of the bridge circuit can be realized in a single device comprising all four pellistor elements of the bridge circuit.

BRIEF DESCRIPTION OF THE DRAWINGS

Further features, advantages and expediencies will become apparent from the following description of exemplary embodiments in conjunction with the figures.

In the figures, elements of the same design and/or function are identified by the same reference numerals. It is to be understood that the embodiments shown in the figures are illustrative representations and are not necessarily drawn to scale.

In the following, specific details are set forth, such as features of the sensor device and the electronic assembly as well as advantageous effects thereof and methods for operating them, in order to provide a thorough understanding of embodiments of the invention. It will be apparent to one skilled in the art that embodiments of the invention may be practiced without these specific details.

DETAILED DESCRIPTION OF ILLUSTRATIVE EMBODIMENTS

Figure 1A:
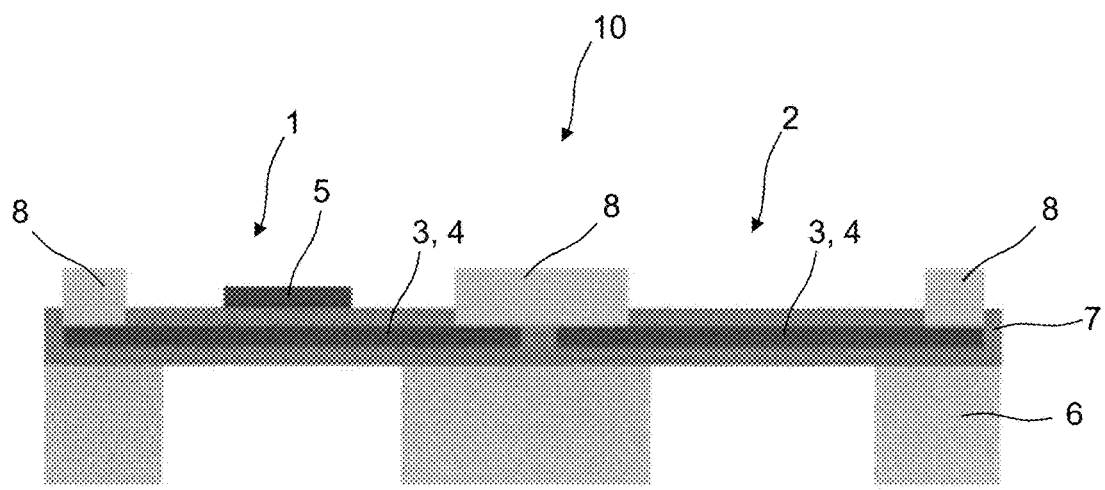
FIGS. 1A and 1B illustrate embodiments of sensor devices.
Figure 1B:
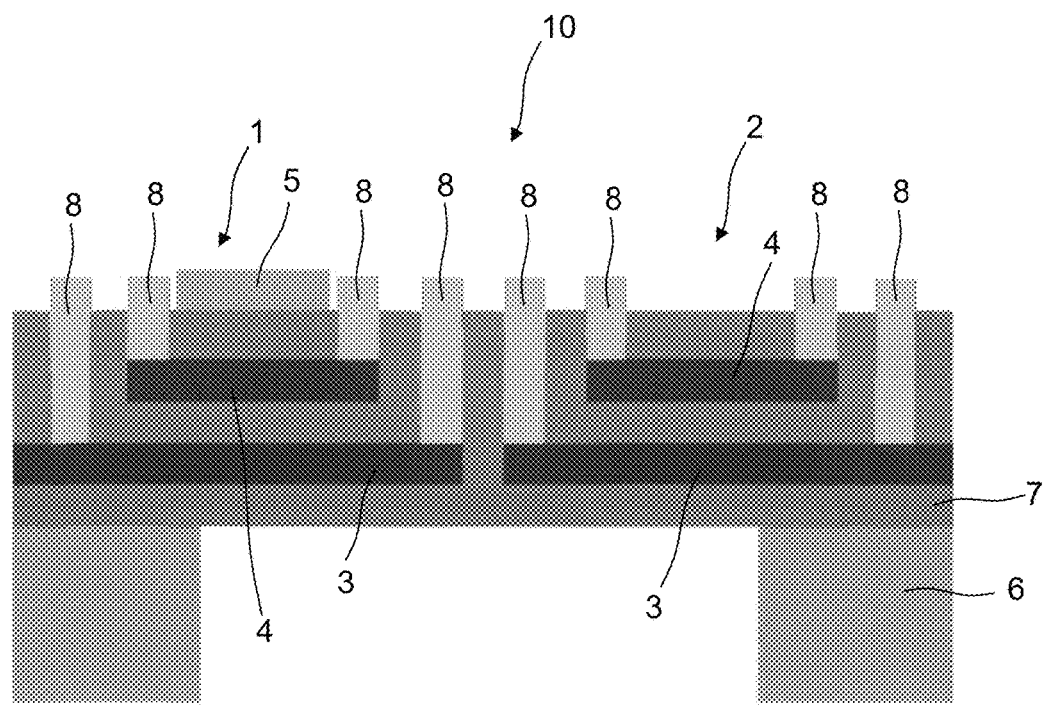

FIGS. 1A and 1B illustrate exemplary embodiments of a sensor device 10. In both Figures, the sensor device 10 is shown by way of example having two pellistor elements 1, 2. Each of the pellistor elements 1, 2 comprises a heater element 3 and a temperature sensor element 4.

According to the embodiment of FIG. 1A, in each pellistor element 1, 2 the heater element 3 is the temperature sensor element 4, meaning that the heater element 3 and the temperature sensor element 4 are embodied as one and the same component, which can also be denoted as a combined heater and temperature sensor element 3, 4. The combined heater and temperature sensor element 3, 4 comprises a filament, which, on the one hand, acts as a resistance heater upon appliance of a sufficiently high electrical current. For concentrating the produced heat in a desired area, at least a part of the filament can be formed in a meander-like shape. On the other hand, the filament changes its electrical resistance depending on its temperature, so that measuring the electrical resistance, or an electrical property depending on the electrical resistance, can provide information about the temperature of the combined heater and temperature sensor element 3, 4. Preferably, each of the combined heater and temperature sensor elements 3, 4 comprises an NTC or PTC material. For example, the combined heater and temperature sensor elements 3, 4 of each of the pellistor elements 1, 2 of the embodiment of FIG. 1A comprises a noble metal as, for example, Pt, which can be used as a heater material and which has a temperature-depending electrical resistance. For providing the electrical current to the combined heater and temperature sensor element 3, 4 when operated as a heater and/or for measuring an electrical property of the heater and temperature sensor element 3, 4, the pellistor elements 1, 2 comprise electrical contacts 8.

As further illustrated in FIG. 1A, the pellistor elements 1, 2 are arranged on a common substrate 6, which can be made, for example, from silicon. The pellistor elements 1, 2 each further comprise a membrane 7 on the substrate 6. The combined heater and temperature sensor element 3, 4 of each of the pellistor elements 1, 2 is at least partly situated in the respective membrane 7, which can comprise or can be made of silicon oxide and/or silicon nitride and at least partly encloses the combined heater and temperature sensor element 3, 4. The membrane 7 has a thickness in the range of about 400 nm to 10 µm. The substrate 6 has openings in the regions where the combined heater and temperature sensor elements 3, 4 are situated so that the thermal mass of the pellistor elements 1, 2 is very low. The substrate 6 and/or the membrane 7 with the components arranged in the membrane 7 can be manufactured by standard MEMS (microelectromechanical systems) technology, thereby providing small dimensions of typically 2×2 mm$^2$ and a high degree of integration.

Alternatively to the embodiment shown in FIG. 1A, each of the pellistor elements 1, 2 can have a heater element 3 and a temperature sensor element 4, which are separate components, as shown in FIG. 1B. Accordingly, the pellistor elements 1, 2 of the sensor device 10 shown in FIG. 1B are embodied as so-called microcalorimeters. The heater elements 3 and the temperature sensor elements 4 can be embodied as explained above in connection with the combined heater and temperature elements 3, 4 and can all be arranged in the membrane 7, preferably in different planes of the membrane 7 as shown in FIG. 1B. Both the heater elements 3 and the temperature sensor elements 4 can have, at least in part, a meander-like shape. In contrast to the embodiment shown in FIG. 1A, the sensor device 10 of the embodiment shown in FIG. 1B has a substrate 6 with one opening under the membrane 7 which is a common membrane for both pellistor elements 1, 2. Since the heater element 3 and the temperature sensor element 4 of each of the pellistor elements 1, 2 are separate components, the temperature sensor elements 4 can be optimized with regard to their sensitivity, for instance by choosing a suitable material which can be a thermistor material or an NTC material or a PTC material, which can be different from the material of the heater elements 3. Additional contact elements 8 can be provided for contacting the heater elements 3 and the temperature sensor elements 4 separately. As shown in FIG. 1A, the pellistor elements 1, 2 can share a common contact element 8, which connects the pellistor elements 1, 2 in series. Alternatively, as shown in FIG. 1B, the pellistor elements 1, 2 can also have only individually assigned contact elements 8, so that an electrical connection between the pellistor elements 1, 2 can be established by an external connection contacting the contact elements.

In both embodiments, by way of example the pellistor element 1 is embodied as an active pellistor element, in particular as a catalytic pellistor, and comprises a catalyst element 5 in the form of a pellet on the membrane 7. The catalyst element 5 can be arranged on a meander-shaped part of the heater element 3, so that the catalyst element 5 can be effectively heated. The catalyst element 5 comprises or consists of a metal oxide, for instance an oxide with Al and/or Pt. For example, the catalyst element 5 can comprise or consist of platinum oxide and/or aluminum oxide or aluminum oxide mixed with platinum. According to both embodiments, the pellistor element 2 is embodied similarly to the pellistor element 1, but without the catalyst element 5 or, alternatively, instead of a catalyst element with a so-called dummy element (not shown), which for instance resembles the shape and/or the mass of the catalyst element 5, but is inert compared to the catalyst element 5. In each of the embodiments shown in FIGS. 1A and 1B, the pellistor element 2 forms a reference pellistor element. Although here and in the following active pellistor elements are shown as catalytic pellistors, alternatively an active pellistor element can also be embodied as a TC pellistor as explained above in the general part of the description.

When the sensor devices 10 of the embodiments shown in FIGS. 1A and 1B are operated, in both pellistor elements 1, 2 an electrical current is applied to the respective heater element 3 in order to heat both pellistor elements 1, 2. Preferably, an electrical current can be applied to each of the heater elements 3 which would heat the pellistor elements 1, 2 to the same or substantially the same temperature in the absence of a surrounding gas atmosphere. When heated to a temperature of typically at least 200° C. to at least 300° C., the catalyst element 5 combusts gas surrounding the pellistor element 1, thereby generating additional heat. This additional heat increases the temperature of the active pellistor element 1 in comparison to the temperature of the reference pellistor element 2. Consequently, the combustion-generated additional heat produces a change in the electrical resistance of the temperature sensor element 4 of the active pellistor element 1, which is proportional to the gas concentration, in comparison to the electrical resistance of the temperature sensor element 4 of the reference pellistor element 2. When connected in series, the pellistor elements 1, 2 form a voltage divider circuit, in which the ratio of the voltage across the active pellistor element 1 to the voltage across the reference pellistor element 2 changes with changing gas concentrations, while other environmental changes as for instance a change in humidity and/or a change in the ambient temperature will be cancelled out or at least suppressed.

An electronic assembly for measuring a gas concentration comprises at least one active pellistor element and at least one reference pellistor element, which can be embodied as described in connection with FIGS. 1A and 1B. In particular, the at least one active pellistor element and the at least one reference pellistor element can be part of the same sensor device as shown in FIGS. 1A and 1B. Alternatively, it is also possible that the at least one active pellistor element can be part of a first sensor device, while the at least one reference pellistor element can be part of a second sensor device.

Figure 2:
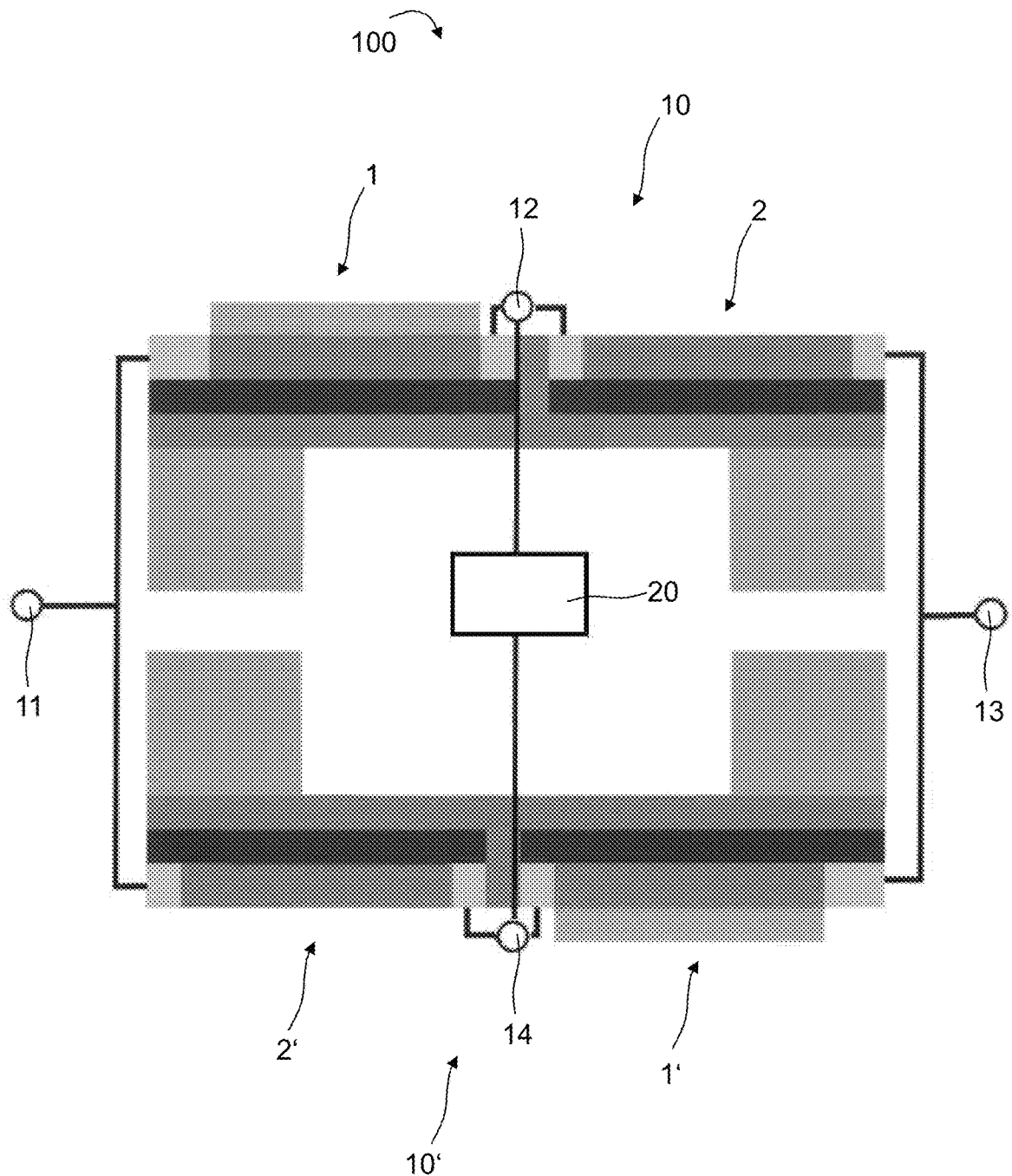
FIG. 2 shows an electronic assembly according to a further embodiment.

FIG. 2 illustrates an embodiment of an electronic assembly 100, in which the pellistor elements are electrically connected to each other and form a Wheatstone Bridge. In particular, the electronic assembly 100 comprises a first active pellistor element 1, a second active pellistor element 1', a first reference pellistor element 2 and a second reference pellistor element 2'. The Wheatstone Bridge additionally comprises a measurement device 20, for instance a voltage measurement device. The Wheatstone Bridge has a first connection point 11, a second connection point 12, a third connection point 13 and a fourth connection point 14. The first active pellistor element 1 is arranged between the first connection point 11 and the second connection point 12, the first reference pellistor element 2 is arranged between the second connection point 12 and the third connection point 13, the second active pellistor element 1' is arranged between the third connection point 13 and the fourth connection point 14, and the second reference pellistor element 2' is arranged between the first connection point 11 and the fourth connection point 14. It is in principle also possible to interchange the active pellistor elements 1, 1' and the reference pellistor elements 2, 2' so that the first reference pellistor element 2 is arranged between the first connection point 11 and the second connection point 12, the first active pellistor element 1 is arranged between the second connection point 12 and the third connection point 13, the second reference pellistor element 2' is arranged between the third connection point 13 and the fourth connection point 14, and the second active pellistor element 1' is arranged between the first connection point 11 and the fourth connection point 14. In other words, the first and third connection point can be interchanged, so that the second described circuit is a mirrored version of the first described circuit.

As exemplarily shown in FIG. 2, the first active pellistor element 1 and the first reference pellistor element 2 can be part of a first sensor device 10, while the second active pellistor element 1' and the second reference pellistor element 2' can be part of a second sensor device 10'. Each of the sensor devices 10, 10' can comprise features as described in connection with the foregoing embodiments. Alternatively, it is also possible that a first sensor device comprises both active pellistor elements 1, 1', while a second sensor device comprises both reference pellistor elements 2, 2'. Furthermore, all pellistor elements 1, 1', 2, 2' can also be integrated in one sensor device. The sensor devices 10, 10' can be embodied, for example, as explained in connection with FIGS. 1A and 1B.

The first connection point 11 and the third connection point 13 are configured for being connected to an electrical voltage. For instance, the first connection point 11 can be connected to a predetermined electrical potential of a supply voltage, while the third connection point 13 can be connected to a ground potential. Accordingly, the first active pellistor element 1 and the first reference pellistor element 2 form one branch of the bridge circuit, while the second active pellistor element 1' and the second reference pellistor element 2' form the other branch of the bridge circuit. Consequently, in each of the two branches of the bridge circuit only an active pellistor element and a reference pellistor element are used without any additional resistor elements.

The second connection point 12 and the fourth connection point 14 are connected to the measurement device 20, measuring a voltage balance between the two bridge circuit branches. Compared to a measurement method which uses only one active pellistor and one reference pellistor in a voltage divider mode, the electronic assembly 100 comprising a Wheatstone Bridge is less sensitive to supply voltage noise. Furthermore, the output of the measurement device 20 is easier to handle by further electronic components as, for example, an ASIC (application-specific integrated circuit), which can be used for processing the measurement of the measurement device 20. For example, for a supply voltage of 3 V the output of a sensor device as shown in FIGS. 1A and 1B in the voltage-divider mode is in the assumed perfectly balanced case, i.e., when not measuring a gas concentration, 1.5 V. When measuring a typical gas concentration the voltage divider will show an output value that deviates from the balanced case by typically less than $10^{-6}$. By way of example, it is assumed that the output value changes to 1.500007 V. In contrast, in the electronic assembly 100 the measurement device 20 will show a measurement value of 0 V in the perfectly balanced case and of 14 V in the before-mentioned exemplary gas-measurement case, which is twice the deviation from the balanced case since two pellistor-element pairs are used in the electronic assembly 100. Of course, it is easier to measure a value in the order of microvolts compared to a value in the order of volts with deviations in the order of microvolts. Accordingly, there is no initial baseline in the order of volts in the readings of the measurement device 20, and the sensitivity is increased by a factor of 2. Furthermore, it can be possible that other influencing environmental effects will be suppressed more easily in the electronic assembly 100 compared to other measurement methods.

Figure 3A:
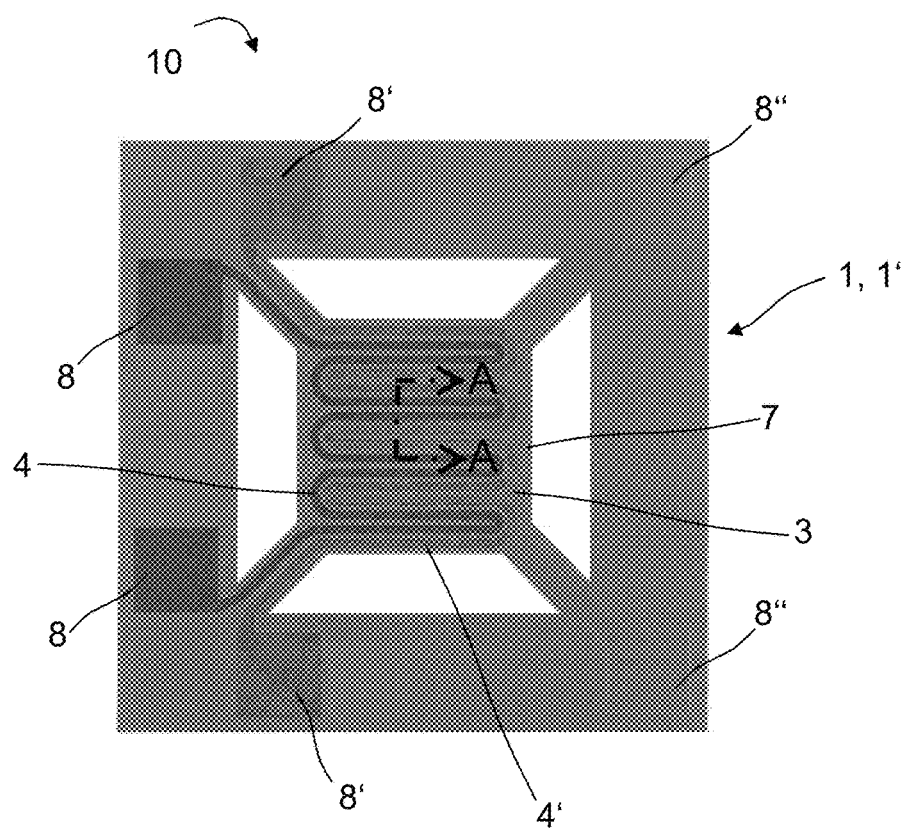
FIGS. 3A to 3C show sensor devices according to further embodiments.
Figure 3B:
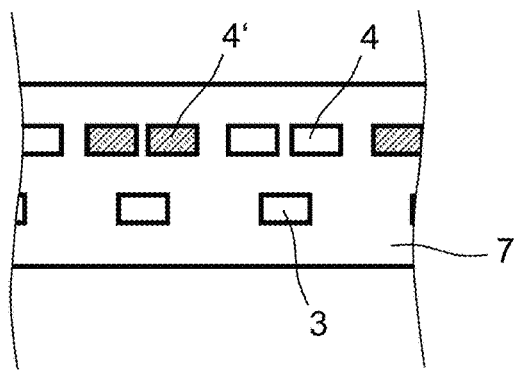
Figure 3C:
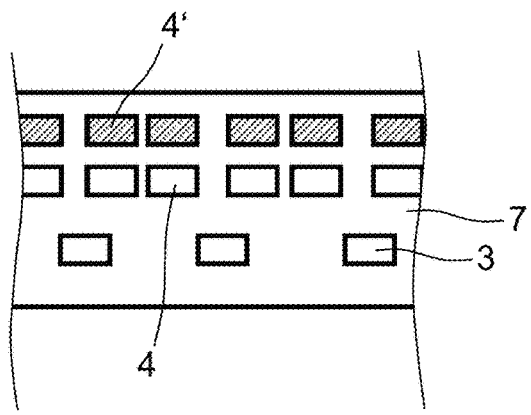

FIGS. 3A to 3C show further embodiments of the sensor device 10. FIG. 3A shows a top view of the sensor device 10, while FIG. 3B shows a sectional view of the sensor device along the section AA indicated in FIG. 3A. FIG. 3C shows a sectional view of an alternative embodiment.

The sensor device 10 according to the embodiments shown in FIGS. 3A to 3C comprises a first pellistor element 1 and a second pellistor element 1', which have at least one common component, meaning that the sensor device 10 comprises at least one component which is part of both pellistor elements 1, 1'. In the illustrated embodiment, the sensor device 10 has at least a heater element 3 as a common component so that the first and second pellistor elements 1, 1' at least share the heater element 3. Furthermore, the sensor device 10 comprises a common substrate and a common membrane 7. For the sake of clarity, the membrane 7 is illustrated transparent in FIG. 3A so that the components which are arranged inside the membrane are visible. As shown in FIGS. 3A and 3B, the sensor device 10 accordingly comprises in the membrane 7 the heater element 3, which has a meander-like shape, as well as a first temperature sensor element 4 and a second temperature sensor element 4', each of which also has a meander-like shape. The heater element 3 and the first temperature sensor element 4 are part of the first pellistor element 1, while the heater element 3 and the second temperature sensor element 4' are part of the second pellistor element 1'. The heater element 3, the first temperature sensor element 4 and the second temperature sensor element 4', each of which can be electrically connected by respective electrical contact elements 8, 8', 8", as well as the other components of the sensor device 10 can comprise features according to the embodiments described above. Preferably, the first and second temperature sensor elements 4, 4" comprise a same material. The two pellistor elements 1, 1' can be two active pellistor elements or two reference pellistor elements as explained above. Alternatively to the shown embodiment the heater element 3 and/or the temperature sensor elements 4, 4' can also be arranged on rather than inside the membrane 7. Furthermore, other shapes for the heater element 3 and/or the temperature sensor elements 4, 4' are possible. In particular, the heater element 3 and/or the temperature sensor elements 4, 4' can have a non-meander-like shape.

As shown in FIG. 3B, the temperature sensor elements 4, 4' can be formed in a same plane in the membrane. In this case, the first and the second temperature sensor elements 4, 4' can be formed in an interlocking meander-like shape, as can also be seen in FIG. 3A. Alternatively, the first temperature sensor element 4 and the second temperature sensor element 4' can be arranged in different planes in the membrane 7 as depicted in FIG. 3C. In this case, an additional lithography layer is needed.

The sensor device 10 according to the embodiments of FIGS. 3A to 3C can have several advantages compared to the foregoing embodiments. In particular, the required area, the material and manufacturing costs as well as the power consumption can be decreased compared to a sensor device having two separate pellistor elements, each comprising its own heater element and temperature sensor element.

Figure 4:
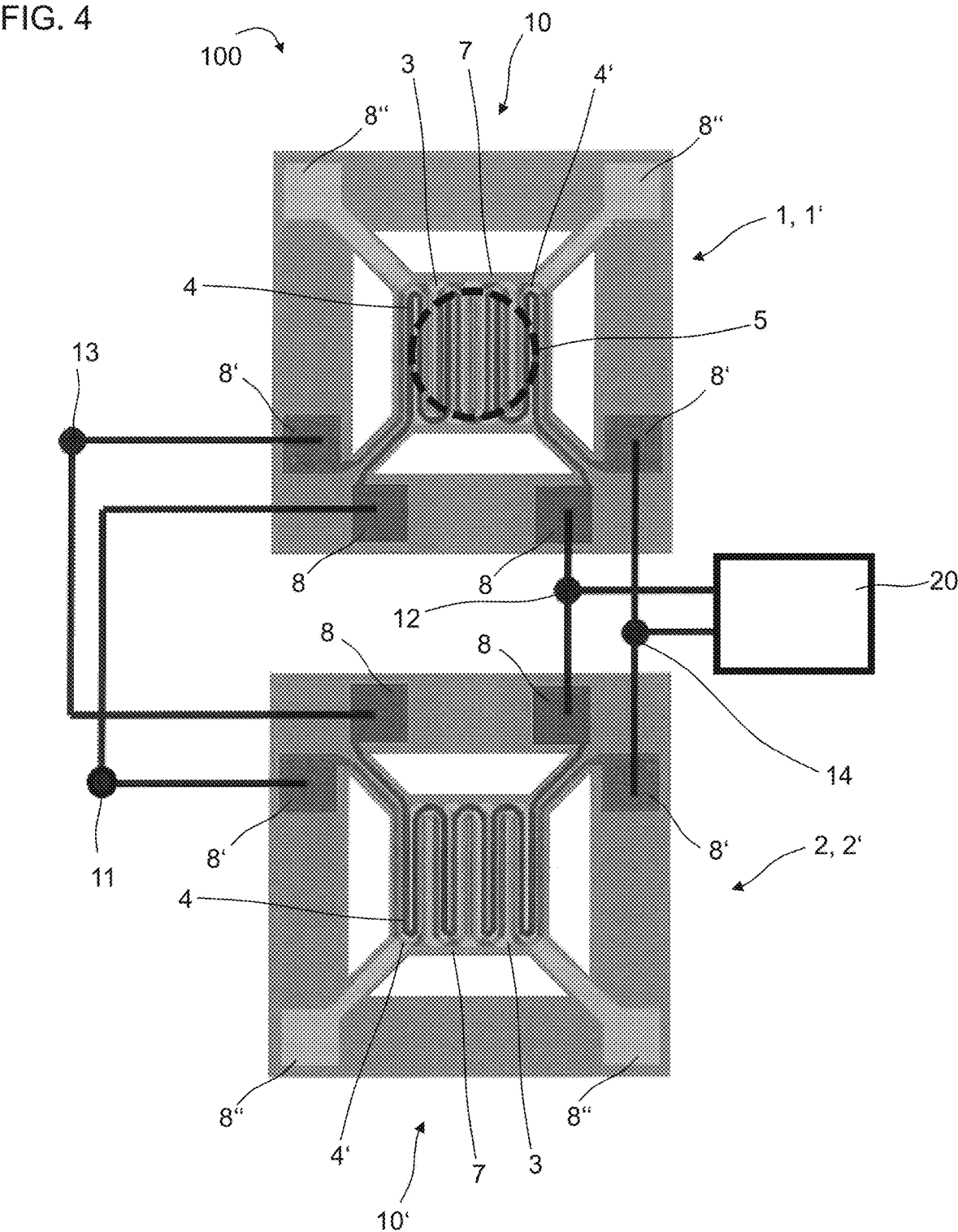
FIG. 4 shows an electronic assembly according to a further embodiment.

FIG. 4 shows an embodiment of an electronic assembly 100 which is based on the same measurement principle as the embodiment shown in connection with FIG. 2, but which has a first and a second sensor device 10, 10' which are embodied as explained in connection with FIGS. 3A to 3C, respectively. For the sake of clarity, means for operating the heater elements 3 have been omitted in FIG. 4.

As explained before, each of the sensor devices 10, 10' comprises a heater element 3, a first temperature sensor element 4 and a second temperature sensor element 4'. In the first sensor device 10, the heater element 3 and the first temperature sensor element 4 are part of a first pellistor element 1, and the same heater element 3 and the second temperature sensor element 4' are part of a second pellistor element 1'. Similarly, in the second sensor device 10', the heater element 3 and the first temperature sensor element 4 are part of a first pellistor element 2, and the same heater element 3 and the second temperature sensor element 4' are part of a second pellistor element 2'. The first sensor device 10 comprises two active pellistor elements, which are embodied as catalytic pellistors. The catalyst element 5 on the membrane of the first sensor device 10 is indicated by the dashed line. The second sensor device 10' comprises two reference pellistor elements, which are embodied similarly to the active pellistor elements of the first sensor device 10, but without the catalyst element.

The pellistor elements of the sensor devices 10, 10' and a measurement device 20 are connected to each other and are arranged between connection points 11, 12, 13, 14 as explained in connection with FIG. 2, thereby forming a Wheatstone Bridge as explained above. Since both sensor devices 10, 10' require substantially half the area compared to the sensor devices in the embodiment shown in FIG. 2, the electronic assembly 100 shown in FIG. 4 can be built more compact. Moreover, since the heater element 3 of each of the sensor devices 10, 10' is part of both respective pellistor elements, the energy consumption of the electronic assembly 100 shown in FIG. 4 can be significantly decreased.

Furthermore, the first and the second sensor device 10,10' can be monolithically formed comprising a common substrate (not shown) so that both branches of the bridge circuit can be realized in a single device comprising all four pellistor elements 1, 1', 2, 2' of the bridge circuit.

Alternatively or additionally to the features described in connection with the figures, the embodiments shown in the figures can comprise further features described in the general part of the description. Moreover, features and embodiments of the figures can be combined with each other, even if such combination is not explicitly described.

The invention is not restricted by the description on the basis of the exemplary embodiments. Rather, the invention encompasses any new feature and also any combination of features, which in particular comprises any combination of features in the Amended patent claims (amendments marked), even if this feature or this combination itself is not explicitly specified in the Amended patent claims (amendments marked) or exemplary embodiments.

What is claimed is:

1. A sensor device comprising:
   a first pellistor element;
   a second pellistor element;
   a heater element;
   a first temperature sensor element;
   a second temperature sensor element,
   wherein the heater element and the first temperature sensor element are part of the first pellistor element and the heater element and the second temperature sensor element are part of the second pellistor element;
   a substrate carrying the first pellistor element and the second pellistor element; and
   a membrane arranged on the substrate,
   wherein the heater element is arranged in the membrane, and/or
   wherein both the first temperature sensor element and the second temperature sensor element are arranged in or on the membrane,
   wherein the first temperature sensor element and the second temperature sensor element are arranged in the same plane in or on the membrane, and
   wherein the first and second temperature sensor elements are formed in an interlocking meandering shape.

2. The sensor device according to claim 1, further comprising a catalyst element, wherein the catalyst element is part of each of the first pellistor element and the second pellistor element.

3. The sensor device according to claim 1, wherein the heater element comprises a noble metal.

4. The sensor device according to claim 1, further comprising a catalyst element, wherein the catalyst element is part of each of the first pellistor element and the second pellistor element, and wherein the catalyst element is arranged on the membrane.

5. The sensor device according to claim 1, wherein the membrane comprises silicon oxide and/or silicon nitride, and wherein the membrane at least partly encloses the heater element and/or the first and second temperature sensor elements.

6. The sensor device according to claim 1, wherein the substrate comprises silicon.

7. The sensor device according to claim 1, wherein the interlocked meandering shape comprises a first U-shaped part of the first temperature sensor element that partly encloses a first U-shaped part of the second temperature sensor element and a second U-shaped part of the second temperature sensor element that partly encloses a second U-shaped part of the first temperature sensor element.

8. The sensor device according to claim 1, wherein the first temperature sensor element has a first part, a second part and a third part, and the second temperature sensor element has a first part, a second part and a third part, and wherein the interlocked meandering shape is provided by the first and second parts of the second temperature sensor element being arranged next to each other and between the first part and the second part of the first temperature sensor element, and the second and third parts of the first temperature sensor element being arranged next to each other and between the second part and the third part of the second temperature sensor element.

9. The sensor device according to claim 1, wherein the first temperature sensor element has a first part, a second part and a third part, and the second temperature sensor element has a first part, a second part and a third part, and wherein the interlocked meandering shape is provided by the first, second and third parts of both the first and second temperature sensor elements being arranged as straight lines that are parallel to each other.

10. The sensor device according to claim 1, wherein the first temperature sensor element has a first part, a second part and a third part, and the second temperature sensor element has a first part, a second part and a third part, wherein the interlocked meandering shape is provided by the first part and second part, for each of the first and second temperature sensor elements, being connected by a first connection part, and the second part and the third part being connected by a second connection part, and wherein each of the first and second connection parts of each of the first and second temperature sensor elements are curved.

11. The sensor device according to claim 1, wherein the first temperature sensor element and/or the second temperature sensor element comprise(s) a material selected from a thermistor material, an NTC material, a PTC material or a noble metal.

12. The sensor device according to claim 11, wherein the noble metal comprises Pt.

13. An electronic assembly comprising:
   a first active pellistor element;
   a second active pellistor element;
   a first reference pellistor element; and
   a second reference pellistor element,
   wherein the first and second active pellistor elements and the first and second reference pellistor elements are connected with each other forming a Wheatstone Bridge,
   wherein the Wheatstone Bridge has a first connection point, a second connection point, a third connection point and a fourth connection point, wherein the first active pellistor element is arranged between the first and the second connection points, wherein the first reference pellistor element is arranged between the second and the third connection points, wherein the second active pellistor element is arranged between the third and the fourth connection points, wherein the second reference pellistor element is arranged between the first and the fourth connection points, wherein the first and the third connection points are configured for being connected to an electrical voltage, wherein the second and fourth connection points are configured for being connected to a measurement device, wherein the first and second active pellistor elements are part of a first sensor device comprising the first active pellistor element, the second active pellistor element, a first heater element, a first temperature sensor element and a second temperature sensor element, wherein the first heater element and the first temperature sensor element are part of the first active pellistor element and the first heater element and the second temperature sensor element are part of the second active pellistor element, and wherein the first and the second reference pellistor elements are part of a second sensor device comprising the first reference pellistor element, the second reference pellistor element, a second heater element, a third temperature sensor element and a fourth temperature sensor element, wherein the second heater element and the third temperature sensor element are part of the first reference pellistor element and the second heater element and the fourth temperature sensor element are part of the second reference pellistor element.

14. The electronic assembly according to claim 13, wherein the first and the second sensor devices are monolithically formed comprising a common substrate.

15. A sensor device comprising:
a first pellistor element;
a second pellistor element;
a heater element;
a first temperature sensor element;
a second temperature sensor element,
wherein the heater element and the first temperature sensor element are part of the first pellistor element and the heater element and the second temperature sensor element are part of the second pellistor element;

a substrate carrying the first pellistor element and the second pellistor element; and a membrane arranged on the substrate, wherein the heater element is arranged in the membrane, and/or wherein both the first temperature sensor element and the second temperature sensor element are arranged in or on the membrane, wherein the first temperature sensor element and the second temperature sensor element are arranged in the same plane in or on the membrane, and wherein each of the first temperature sensor element, the second temperature sensor element and the heater element are arranged in respective different planes in the membrane so that the first temperature sensor element, the second temperature sensor element and the heater element are stacked over each other along a direction perpendicular to the planes.

16. The sensor device according to claim 15, further comprising a catalyst element, wherein the catalyst element is part of each of the first pellistor element and the second pellistor element.

17. The sensor device according to claim 15, further comprising a catalyst element, wherein the catalyst element is part of each of the first pellistor element and the second pellistor element, and wherein the catalyst element is arranged on the membrane.

18. The sensor device according to claim 15, wherein the membrane comprises silicon oxide and/or silicon nitride, and wherein the membrane at least partly encloses the heater element and/or the first and second temperature sensor elements.

19. The sensor device according to claim 15, wherein the substrate comprises silicon.

20. The sensor device according to claim 15, wherein the first temperature sensor element and/or the second temperature sensor element comprise(s) a material selected from a thermistor material, an NTC material, a PTC material or a noble metal.

21. The sensor device according to claim 20, wherein the noble metal comprises Pt.

22. The sensor device according to claim 20, wherein the heater element comprises a noble metal.

* * * * *